(12) United States Patent
Karasawa et al.

(10) Patent No.: US 6,764,745 B1
(45) Date of Patent: Jul. 20, 2004

(54) STRUCTURAL MEMBER SUPERIOR IN WATER REPELLENCY AND METHOD FOR MANUFACTURING THE SAME

(75) Inventors: Yasushi Karasawa, Suwa (JP); Mitsuro Atobe, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/647,469

(22) PCT Filed: Feb. 25, 1999

(86) PCT No.: PCT/JP99/00869
§ 371 (c)(1),
(2), (4) Date: Sep. 27, 2000

(87) PCT Pub. No.: WO00/50232
PCT Pub. Date: Aug. 31, 2000

(51) Int. Cl.[7] .................................................. B32B 3/30
(52) U.S. Cl. ........................ 428/141; 428/142; 428/446; 428/913; 428/220; 428/332; 428/338
(58) Field of Search ................................. 428/141, 142, 428/446, 913, 220, 332, 338

(56) References Cited

U.S. PATENT DOCUMENTS 3,354,022 A * 11/1967 Dettre et al. ................ 264/284

FOREIGN PATENT DOCUMENTS

| JP | 57208256 | 12/1982 |
|---|---|---|
| JP | 63122550 | 5/1988 |
| JP | 02238941 | 9/1990 |
| JP | 03084069 | 4/1991 |
| JP | 03230420 | 10/1991 |
| JP | 04258675 | 9/1992 |
| JP | 04288349 | 10/1992 |
| JP | 06093121 | 4/1994 |
| JP | 06227878 | 8/1994 |
| JP | 10130844 | 5/1998 |
| JP | 10156282 | 6/1998 |
| JP | 10237431 | 9/1998 |
| JP | 10249977 | 9/1998 |
| JP | 11029856 | 2/1999 |
| WO | WO 96/04123 | * 2/1996 |

OTHER PUBLICATIONS

Chapter III—Synthesis, quality and application of inorganic fluorine compounds Nikkan Kogyo Shinbun (Mar. 1, 1997), pp. 59–63 (Abstract and in the Japanese language).
Kanpenilex Instruction Manual, Kansai Paint Co., Ltd—Fluororesin–special hydrophobic pigment (Jun., 1991) (Abstract and in the Japanese language).
Provision of water–repellency by painting Surface Technologies, vol. 47, No. 7 (1996), pp. 2–32 (Abstract and in the Japanese language).
New–ice repellent coatings– Their formulations and functions—No. 117 (Dec. 1989) 4.3.1, Chemical composition of ultra–water–repellent materials 4.3.2, characterization (Abstract and in the Japanese language).
Relationship between Surface Properties and Water Repellency of Fluorochemical Finishes Senni–gakkaishi, 52, 493 (1996) (Abstract and in the Japanese language).
Control Surface Configuration (Abstract and in the Japanese language).

* cited by examiner

Primary Examiner—William P. Watkins, III
(74) Attorney, Agent, or Firm—Harness, Dickey & Pierce, P.L.C.

(57) ABSTRACT

A structural member in which a super water-repellent function and high durability and scratch assistance can be obtained; and a method of manufacturing such a structural member. A water-repellent structure (100) consisting of appropriate irregularities comprising protrusion portions (18) uniform in height is formed on an external surface. The irregularities (17 and 18) have such dimensions that any droplet should not fall in a recess portion and the droplet is in contact with an air layer (20) in the recess portion (17).

15 Claims, 13 Drawing Sheets

(A)

(B)

(C)

STRUCTURAL MEMBER SUPERIOR IN WATER REPELLENCY AND METHOD FOR MANUFACTURING THE SAME

TECHNICAL FIELD

The present invention relates to a structural member superior in water repellency for electric wires, building materials, ships, antennas, air crafts, etc; and a method for manufacturing the same.

PRIOR ART

Water repellent treatment has been conventionally performed for preventing adhesion of droplets or preventing pollution. Various water repellent materials and water repellent treatments have been developed and used in a variety of products including electronic equipment. For example, in order to obtain an electric wire to which snow hardly adheres, JP-A-3-230420 proposes a method in which a carbon containing thin film is formed on the surface of an aluminum wire or the like, and the film-formed wire is subsequently passed through a space where a fluorine compound is ionized so that a fluorine compound thin film is formed on the wire. However, plasma polymerization of fluorine film is performed in this method. Accordingly, the thin film may be easy to peel off and inferior in adhesion. In addition, JP-A-3-84069, JP-A-4-258675 and JP-A-2-238941 propose paints to be applied to ships, marine building materials, water transport pipes, etc. in order to prevent ice-adhesion or snow-adhesion or to prevent corrosion. However, there is a problem that the paint is easy to peel off because the paint is applied in the form of a coating.

Further, JP-A-6-93121 proposes a method in which a surface of a base material is roughed by using FRP or the like as filler and a chlorosilane surface active agent is absorbed in the roughed surface to perform water-repellent and oil-repellent treatment, in order to obtain a member which is superior in water repellency, oil repellency and antifouling property. In addition, JP-A-4-288349 proposes a technique for obtaining a water-repellent and oil-repellent film in which a surface is roughed by making a surface layer contain particulates or by applying chemical etching to the surface, and a water-repellent polymer layer is chemically bonded with the surface so as to form a film on the surface. However, any technique disclosed in the above publications has a problem that the film is uneven in height of the surface, insufficient in mechanical strength, problematical in durability and scratch resistance, and not uniform in water repellency. In addition, JP-A-10-156282 proposes a technique in which a water-repellent resin film of hydrophobic resin containing particulate powder is formed on a surface of metal material having a 0.1 to 50 μm fine irregularity structure. However, this also has a problem that the film is insufficient in mechanical strength and not uniform in water repellency.

Although those which have a water-repellent function are heretofore proposed as mentioned above, each of the techniques has a problem in durability and scratch resistance, so that the water-repellent function cannot be maintained over a long term.

DISCLOSURE OF THE INVENTION

It is an object of the present invention to provide a structural member in which not only a super water-repellent function but also high durability and high scratch resistance can be obtained; and to provide a method for manufacturing such a structural member.

(1) A structural member according to an aspect of the present invention is configured such that a water-repellent structure which is constituted by appropriate irregularities of protrusion portions and recess portions and which is uniform in height of the protrusion portions is formed on the external surface of the structural member.

(2) A structural member according to the present invention is configured such that in the above-mentioned structural member (1), the depth of each of the recess portions is not less than a predetermined value.

(3) A structural member according to another aspect of the present invention is configured such that in the above-mentioned structural member (1) or (2), the irregularities have a size enough to prevent a droplet from falling into a recess portion and to allow the droplet to come into contact with an air layer in the recess portion.

(4) A structural member according to a further aspect of the present invention is configured such that in any one of the above-mentioned structural members (1) to (3), a water-repellent film reactively bonded with the irregularities of the water-repellent structure is formed on the irregularities.

(5) A structural member according to a further aspect of the present invention is configured such that in any one of the above-mentioned structural members (1) to (3), the water-repellent structure is constituted by irregularities formed on a base material having a water-repellent function.

(6) A structural member according to a further aspect of the present invention is configured such that in any one of the above-mentioned structural members (1) to (5), the irregularities comprises the protrusion portions arranged in distribution in lines or in the form of a lattice.

(7) A wire according to a further aspect of the present invention is configured such that a jacket of the wire is constituted by a structural member according to any one of the structural members (1) to (6).

(8) A building material according to a further aspect of the present invention is configured such that the building material has a surface which is constituted by a structural member according to any one of the structural members (1) to (6).

(9) A ship member according to a further aspect of the present invention is configured such that the ship member has a surface constituted by a structural member according to any one of the structural members (1) to (6).

(10) An antenna according to a further aspect of the present invention is configured such that the antenna has a surface constituted by a structural member according to any one of the structural members (1) to (6).

(11) An air-craft member according to a further aspect of the present invention is configured such that the air-craft member has a surface constituted by a structural member according to any one of the structural members (1) to (6).

(12) A method for manufacturing a structural member according to a further aspect of the present invention is configured such that in a method for manufacturing any one of the structural members (1) to (6), the irregularities of the water-repellent structure are formed by a mold having a shape corresponding to the irregularities.

(13) A method for manufacturing a structural member according to a further aspect of the present invention is configured such that in the manufacturing method (12), a roller having an outer circumferential portion in which the shape corresponding to the irregularities of the water-repellent structure is formed is pressed onto the surface of a base material.

(14) A method for manufacturing a structural member according to a further aspect of the present invention is configured such that in the manufacturing method (12), a not-yet-solidified base material is passed through a die having an inner circumferential portion in which the shape corresponding to the irregularities of the water-repellent structure is formed.

(15) A method for manufacturing a structural member according to a further aspect of the present invention is configured such that in the manufacturing method (14), the water-repellent structure is manufactured by use of a photolithography method and an etching method. This etching method is, for example, a trench dry etching method; an anodic electrolysis method; an anisotropic wet etching method; an isotropic wet etching method; or an isotropic dry etching method.

In the present invention, a water-repellent structure in which irregularities are formed in the outer surface and the protrusion portions of the irregularities are made uniform in height as mentioned above to thereby obtain not only a super water-repellent function but also high durability and high scratch resistance. That is, if the protrusion portions are uneven in height as in the conventional case, portions in which a super water-repellent function cannot be obtained are formed and the portions have an insufficient mechanical strength and easily wear, so that there is a problem in durability and scratch resistance. However, in the present invention, such a problem is solved. In addition, when a water-repellent film is provided, the water-repellent film is reactively bonded with the irregularities of the water-repellent structure, so that the water-repellent film is hardly peeled off. In addition, when the water-repellent structure is manufactured by a photolithography method and an etching method in the present invention, it is possible to make the protrusion portions uniform in height with precision. The details of the present invention including its operation principle will be explained in Embodiment 1 which will be described below. In the present invention, it is defined that the conception of super water-repellency includes super oil-repellency.

THE BEST MODE FOR CARRYING OUT THE INVENTION

Embodiment 1

Figure 1:
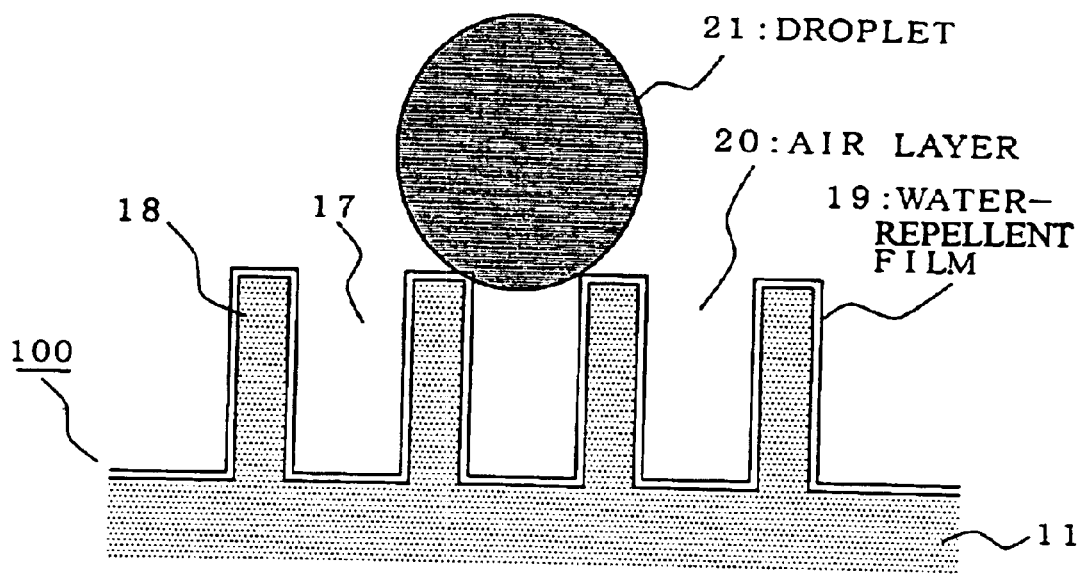
FIG. 1 is an explanatory view of a water-repellent structure according to Embodiment 1 of the present invention.

FIG. 1 is an explanatory view of a water-repellent structure according to Embodiment 1 of the present invention. In FIG. 1, in a water-repellent structure 100, recess portions 17 and protrusion portions 18 are formed on a surface of a silicon substrate 11, and a water-repellent film 19 is formed on the surfaces of the recess portions 17 and the protrusion portions 18. Air layers 20 are generated in these recess portions formed on the surface of the silicon substrate 11. Although this embodiment shows the case where the water-repellent film 19 is formed, a base material which has a water-repellent function in itself, for example, Teflon resin or the like may be used.

Figure 2:
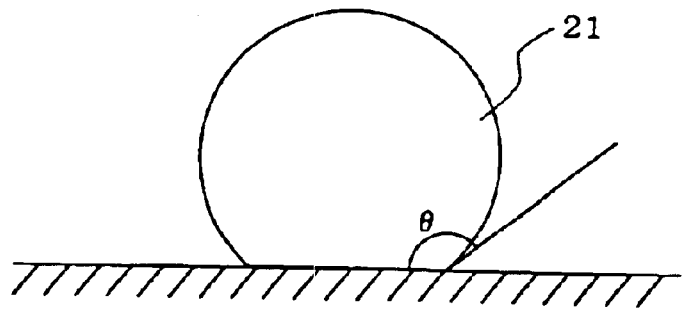
FIG. 2 is an explanatory view of a contact angle of water when a water-repellent function is effected.

FIG. 2 is an explanatory view of a contact angle of water when the water-repellent function is shown. To show the water-repellent function, it is necessary that the contact angle θ of water is 120 degrees or more (90 degrees or more in the case of an ink droplet) as shown in FIG. 2. In order to make the contact angle θ of water be 120 degrees or more so that the water-repellent function is shown in the water-repellent structure 100 in FIG. 1, it is preferable that the irregularities (recess-protrusion) have such dimensions as to prevent a droplet 21 from falling into a recess portion 17 and allow the droplet 21 to contact an air layer 20.

Figure 3:
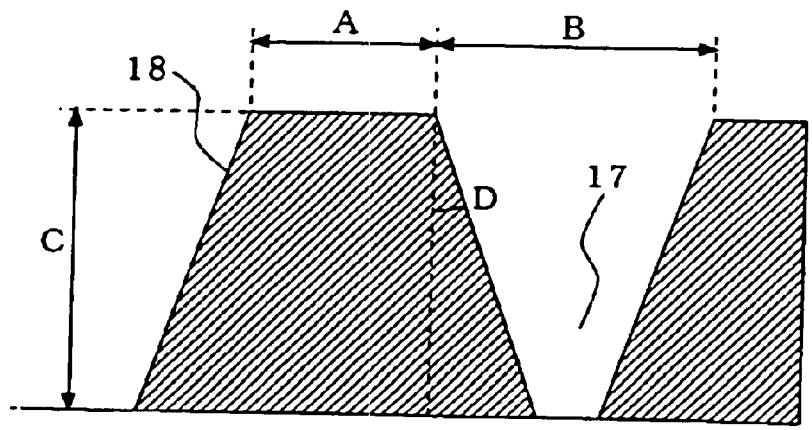
FIG. 3 is a view for explaining the dimensions of a recess portion and a protrusion portion in FIG. 1.

FIG. 3 is a view for explaining the dimensions of each recess portion 17 and each protrusion portion 18 in FIG. 1. In FIG. 3, the symbol A designates a protrusion width (depending on mask design); B, a groove width (depending on the mask design); C, a working quantity (depth: depending on etching time); and D, a side wall angle (depending on etching condition). When this water-repellent structure is applied, for example, to a structure which contacts with an ink droplet or the like, the above-mentioned widths A and B are restricted naturally by the relation with the diameter of the ink droplet, which is about 10 μm. In addition, the above-mentioned C needs to have a certain degree of depth for preventing the ink droplet from getting in contact with the bottom of a groove and being enclosed therein. Therefore, the above-mentioned widths A and B are restricted in a range from 0.2 to 500 μm, preferably from 0.5 to 30 μm, more preferably from 1 to 10 μm. In addition, the above-mentioned C is restricted to a depth of 1 μm or more, preferably 3 μm or more, more preferably 5 μm or more. The evenness of the height of the protrusion portions is restricted to be within 0.5 times as large as the value of the widths A and B, preferably within 0.3 times, more preferably within 0.1 times, from the point of view of the scratch resistance.

Figure 4:
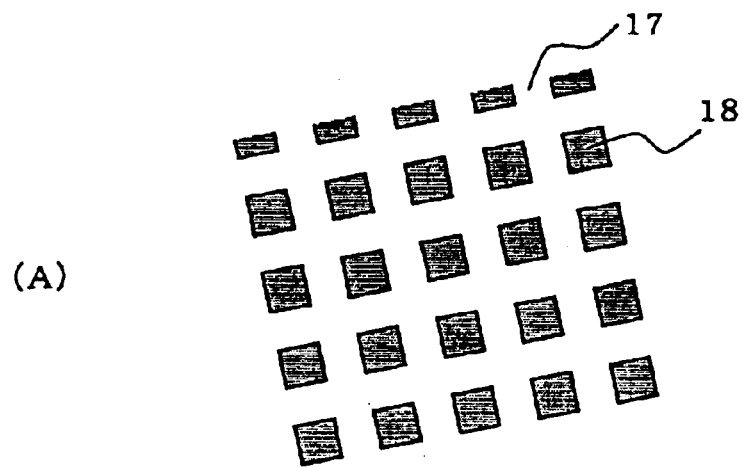
FIGS. 4a–4c are plan views of a water-repellent structure 100 in FIG. 1.
Figure 4:
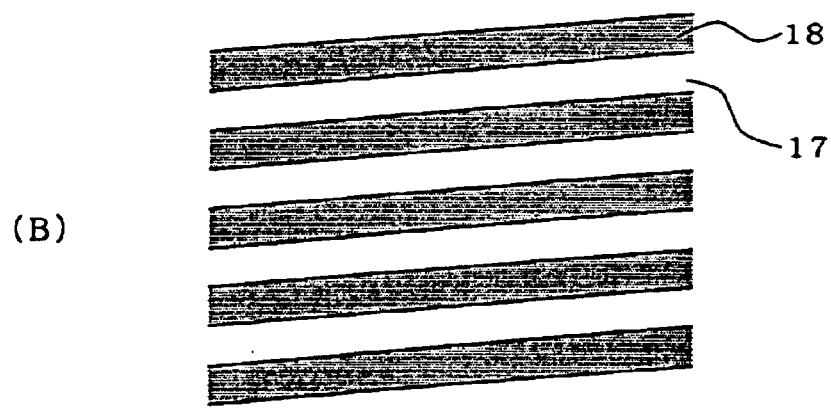
Figure 4:
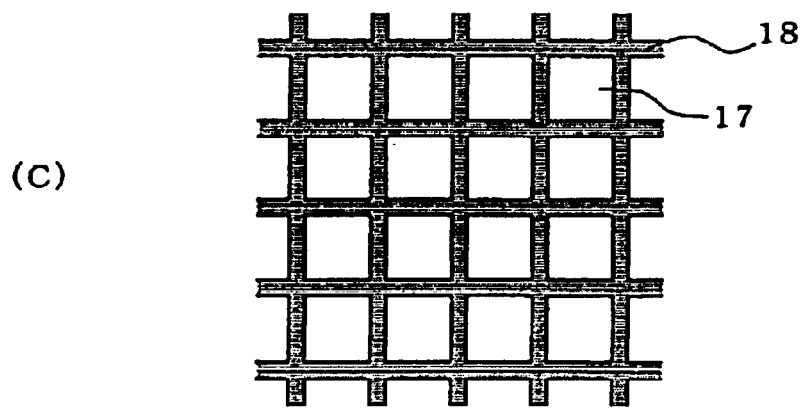

FIG. 4 is a plan view of the water-repellent structure in FIG. 1. FIG. 4(A) shows an example in which the protrusion portions 18 are arranged and distributed regularly. FIG. 4(B) shows an example in which the protrusion portions 18 are arranged in the form of lines. FIG. 4(C) shows an example in which the protrusion portions 18 are arranged in the form of a lattice. Although FIG. 4(A) shows an example in which the protrusion portions 18 are square prisms, they may be various pillars such as triangular prisms, pentagonal prisms, hexagonal prisms, columns, etc.

Embodiment 2

Figure 5:
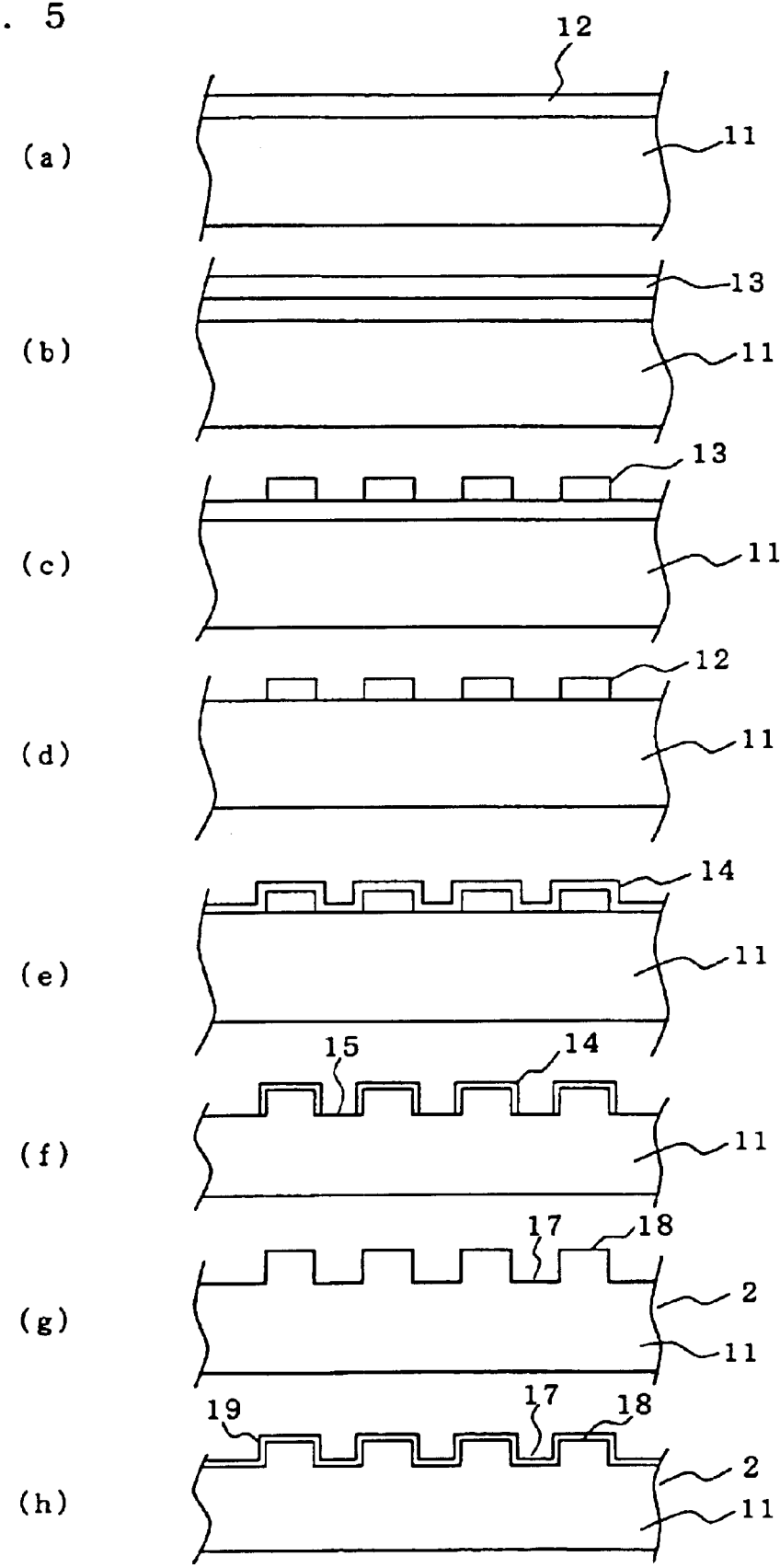
FIGS. 5a–5h are sectional views showing a manufacturing process for forming a water-repellent structure on a surface of a plate in a manufacturing method according to Embodiment 2 of the present invention.
Figure 6:
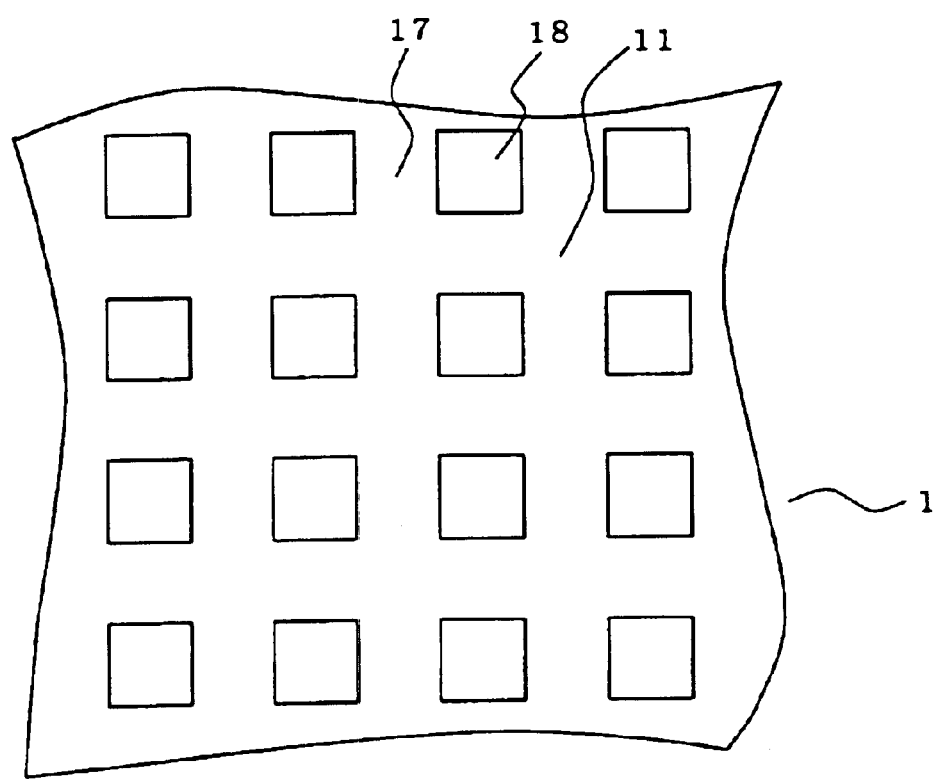
FIG. 6 is a top view of the plate in which the water-repellent structure has been formed on the surface.

FIG. 5 is a sectional view showing a manufacturing process for forming a water-repellent structure on a surface of a plate. FIG. 6 is a top view of the plate 1 in which the water-repellent structure has been formed on the surface. The procedure of manufacturing the water-repellent structure will be described with reference to FIGS. 5 and 6. Here, description will be made about the case where the surface of a silicon substrate is worked by a photolithography method and a trench dry etching method so as to form a water-repellent structure.

① First, a 4-inch single-crystal silicon wafer of the (100) crystal orientation is prepared as a base material of the plate 1. A silicon oxide film 12 of about 1,000 Angstroms is formed on at least one surface of the single-crystal silicon substrate 11 by use of a thermal oxidation method, as shown in FIG. 5(a).

② Next, as shown in FIG. 5(b), about 2 ml of photosensitive resin OFPR-800 (viscosity: 30 cps) made by TOKYO OHKA KOGYO CO., LTD. is dropped onto the silicon oxide film 12 of the single-crystal silicon substrate 11, and spin-coated for 30 seconds at the velocity of 5,000 rotations per minute, so that a photosensitive resin film 13 is formed. By these spin-coat conditions, the photosensitive resin can be applied so that the average film thickness is about 1 μm with dispersion of 10% within the wafer surface. Incidentally, the coating film thickness may be changed appropriately in accordance with the dimensions of a groove to be worked. The maximum value of the thickness of the photosensitive resin film to be applied is 2 μm when the dimension of the groove width is 2 μm.

③ Next, the substrate 11 is dried for 30 minutes in an oven at a temperature of 90° C., and cooled down to the room temperature. As shown in FIG. 5(c), square protrusion-portion-expected areas 13 each having one side in a range from 0.2 μm to 200 μm are photolitho-patterned on the substrate 11. Then, the photosensitive resin is solidified by the oven at a temperature of 120° C., so that the etching-proof property is improved.

④ As shown in FIG. 5(d), the silicon oxide film in groove-expected areas is etched with fluoric acid, and the photosensitive resin is removed by release agent.

⑤ Next, by use of a trench dry etching apparatus, a plasma synthetic film 14 is formed with gas containing C and F, as shown in FIG. 5(e). Succeedingly, after the dry etching apparatus has been evacuated, silicon in the area of groove bottoms 15 is etched with plasma of gas having a chemical formula $SF_6$ or $CF_4$, as shown in FIG. 5(f). The above-mentioned plasma polymerization and plasma etching are repeated. As a result, grooves each having the depth of about 5 μm are etched on the surface of the single-crystal silicon substrate 11 so that the recess portions 17 and the protrusion portions 18 are formed, as shown in FIG. 5(g). These protrusion portions 18 are laid out regularly on the surface of the single-crystal silicon substrate 11, as shown in FIG. 6.

⑥ Next, fluoroalkylsilane or polyfluoroethylene water-repellent material is deposited on the single-crystal silicon substrate 11 by a vacuum deposition method, so that a water-repellent film 19 is formed (FIG. 5(h)).

EXAMPLE 1

As Example 1 of the present invention, examples shown in Table 1 were attempted in the above-mentioned Embodiment 2. First, substrate materials of samples 1 to 7 are prepared for the plate substrate 11. Then, the protrusion-portion-expected areas 13 (see FIG. 5(c)) are formed by patterning squares each in a range from 0.2 μm to 1,000 μm. In addition, the water-repellent film 19 on the plate 1 is formed by depositing fluoroalkylsilane or polyfluoroethylene water-repellent material. This water-repellent treatment is not performed on the samples 2, 4 and 6.

TABLE 1

|  | substrate material | protrusion size (micron square) | water-repellent treatment |
| --- | --- | --- | --- |
| Sample 1 | silicon | 0.2 | Yes |
| Sample 2 | silicon | 0.2 | No |
| Sample 3 | glass | 5 | Yes |
| Sample 4 | quartz | 5 | No |
| Sample 5 | quartz | 10 | Yes |

TABLE 1-continued

| | substrate material | protrusion size (micron square) | water-repellent treatment |
|---|---|---|---|
| Sample 6 | silicon | 10 | No |
| Sample 7 | glass | 500 | Yes |

(Comparison 1)

Figure 7:
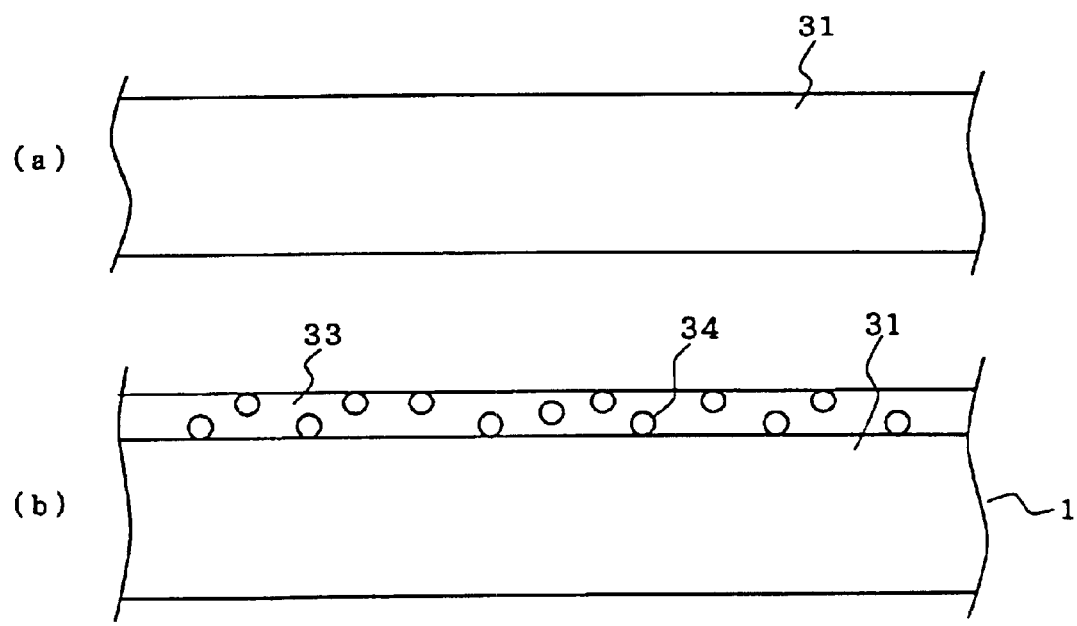
FIGS. 7a–7b are sectional views showing a manufacturing process of a plate in Comparison 1.

FIG. 7 is a sectional view showing a manufacturing process of Comparison 1 in which water-repellent material is applied to a plate of stainless steel.

① First, a substrate 31 is subjected to ultrasonic cleaning with an alkali solvent, as shown in FIG. 7(a).

② The substrate 31 is immersed in nickel plating electrolyte containing polyfluoroethylene particulates enhanced in fluorine atom density. Then, as shown in FIG. 7(b), an eutectoid plating film 33 in which polyfluoroethylene particulates 34 enhanced in fluorine atom density are dispersed is produced on the surface of the substrate 31 by electric plating. This plating film 33 contains the polyfluoroethylene particulates 34 enhanced in fluorine atom density.

(Comparison 2)

Figure 8:
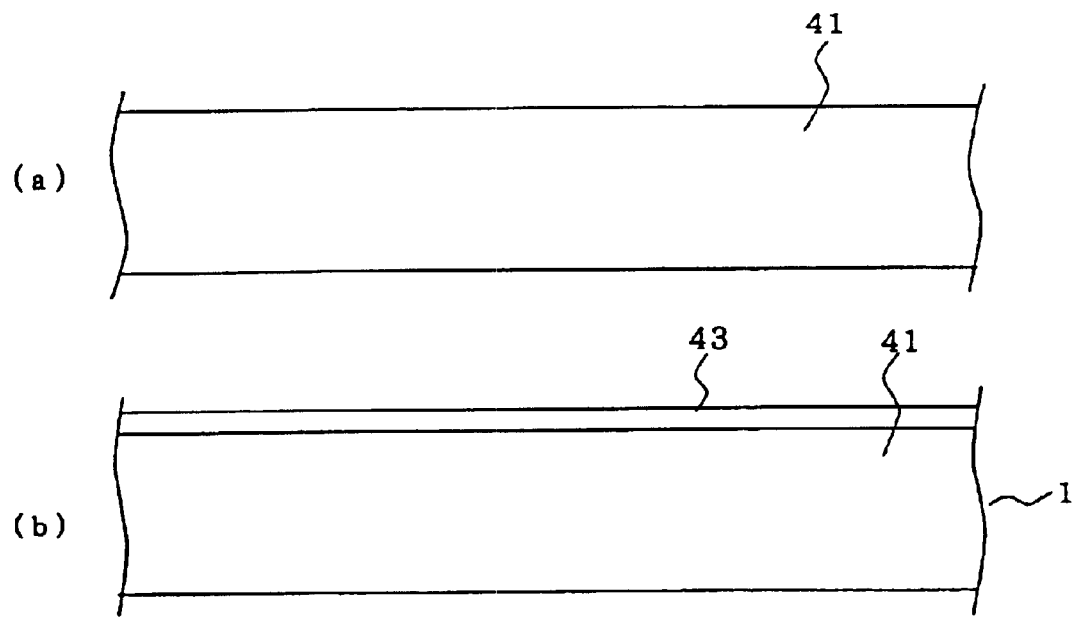
FIGS. 8a–8b are sectional views showing a manufacturing process of a plate in Comparison 2.

FIG. 8 is a sectional view showing a manufacturing process in this Comparison 2 in which a plate of polysulfone is coated with water-repellent material.

① First, a substrate 41 is subjected to ultrasonic cleaning with an alkali solvent, as shown in FIG. 8(a).

② Succeedingly, the trade name "KANPENIREX" (fluorine-containing resin) made by KANSAI PAINT CO., LTD. is applied to the surface of the substrate 41, so that a coating film 43 is produced as shown in FIG. 8(b).

Table 2 shows the results of measurement of contact angles of water to the surfaces of the plates in the above-mentioned Example 1, Comparisons 1 and 2.

TABLE 2

| | Water contact angle (degrees) |
|---|---|
| Example | |
| Sample 1 | 160 |
| Sample 2 | 150 |
| Sample 3 | 160 |
| Sample 4 | 140 |
| Sample 5 | 150 |
| Sample 6 | 145 |
| Sample 7 | 140 |
| Comparison 1 | 130 |
| Comparison 2 | 160 |

As shown in the above Table 2, it was confirmed that each of the contact angles of water to the plates in this Example 1 (Samples 1 to 7) exceeded 120 degrees, which is higher than the value in Comparison 1. Further, through durability and scratch resistance tests, it was confirmed that this Example 1 (Samples 1 to 7) could obtain higher durability and scratch resistance than Comparison 2.

EXAMPLE 2

In Example 2 of the present invention, examination was made about the contact angle of water in the protrusion shapes of water-repellent structures, which are arranged in square prisms, in lines and in the form of a lattice (see FIGS. 4(A), (B) and (C)). Table 3 shows data of them. It is understood that each of the water-repellent structures (No. 1 to 10) according to the present invention had a contact angle of water of 120 degrees or more so as to obtain a water-repellent function. A Comparison of No. 11 in Table 4 in which a water-repellent film was formed on a mirror-finished ground surface (correspondingly to the prior art), did not satisfy the necessary conditions for obtaining a water-repellent function.

TABLE 3

| | | structure dimensions (actual measurements) | | | | |
|---|---|---|---|---|---|---|
| No. | structure | protrusion width A (μm) | groove width B (μm) | working quantity C (μm) | side wall angle D (°) | pure water (°) |
| 1 | square columns | 0.2 | 2.4 | 3.2 | 14 | 140 |
| 2 | square columns | 1.0 | 6.0 | 6.8 | 1 | 158 |
| 3 | lines | 1.2 | 2.0 | 7.8 | 1 | 138 |
| 4 | square columns | 1.5 | 2.5 | 3.6 | 3 | 140 |
| 5 | square columns | 3.4 | 3.8 | 5.0 | 12 | 140 |
| 6 | square columns | 4.0 | 6.0 | 8.6 | 0 | 150 |
| 7 | lines | 4.0 | 6.0 | 8.0 | 4 | 131 |
| 8 | square columns | 5.2 | 4.8 | 2.8 | 4 | 149 |
| 9 | square columns | 6.0 | 4.0 | 3.2 | 18 | 158 |
| 10 | lattice | 4.3 | 6.0 | 10.0 | 2 | 123 |
| 11 | comparative example: a water-repellent treatment onto a mirror surface | | | | | 115 |

Embodiment 3

Figure 9:
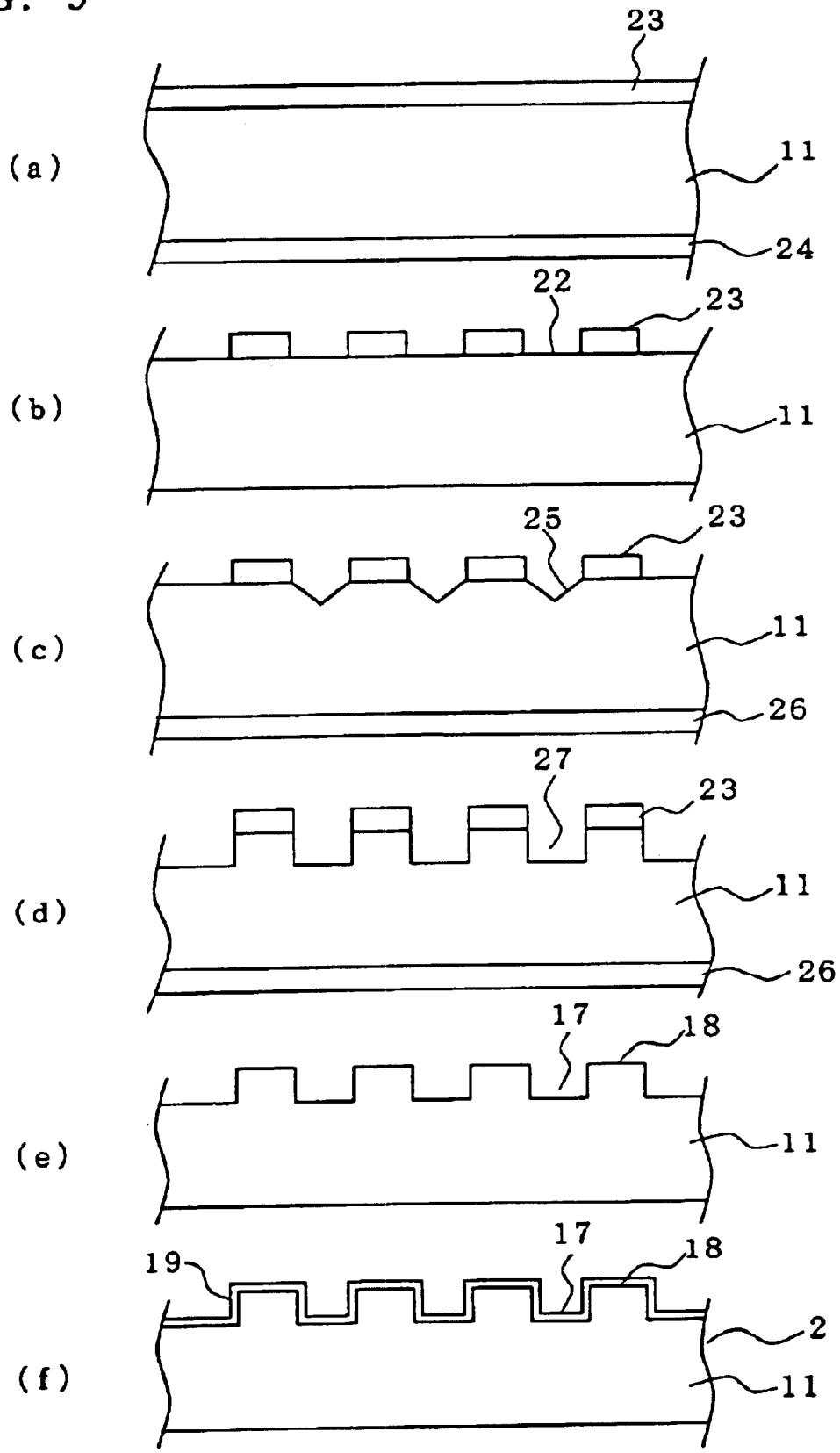
FIGS. 9a–9f are sectional views showing a manufacturing process for forming a water-repellent structure on a surface of a plate in a manufacturing method according to Embodiment 3 of the present invention.

FIG. 9 is a sectional view showing another example of a manufacturing process for forming a water-repellent structure on a surface of a plate. Here, description will be made about the case where the surface of a silicon substrate is worked by a photolithography method and an anodic electrolysis method so that a water-repellent structure is formed.

① First, for example, a 200 μm thick n-type single-crystal silicon substrate 11 of the (100) crystal orientation is prepared as base material of a plate.

② Silicon nitride films 23 and 24 0.3 μm thick are formed as etching-proof films on this silicon substrate 11 by a CVD apparatus, as shown in FIG. 9(a).

③ Next, after the silicon nitride film 24 is removed by a dry etching method, photo-etching is given to the silicon nitride film 23 so that the silicon nitride film 24 is etched in portions 22 corresponding to the recess portions 17 of the water-repellent structure, as shown in FIG. 9(b).

④ Next, etching pyramids 25 shaped into V-grooves are worked in the silicon substrate 11 by an anisotropic etching method with a potassium hydrate solution using the silicon nitride film 23 as a mask. An indium-tin oxide film (ITO film) 26 is formed on the opposite surface of the silicon substrate 11 to the surface where the silicon nitride film 23 has been formed as shown in FIG. 9(c).

⑤ Succeedingly, an electrolytic cell is so assembled that the above-mentioned surface with the silicon nitride film 23 can be in contact with electrolyte. While light is irradiated to the silicon substrate 11 from the surface opposite to the surface with the silicon nitride film 23, grooves 27 about 5 μm deep are etched as shown in FIG. 9(d), so that the recess portions 17 and the protrusion portions 18 are produced (FIG. 9(*e*)).

⑥ Fluoroalkylsilane or polyfluoroethylene water-repellent material is deposited on the plate by a vacuum deposition method, so that a water-repellent film 19 is formed (FIG. 9(*f*)).

Even in the above-mentioned water-repellent structure produced in Embodiment 3, it was confirmed that a water-repellent function, durability and scratch resistance similar to those in the above-mentioned Embodiment 2 could be obtained because of the even height of the protrusion portions.

Although examples using a silicon substrate as material of a plate are described in the above-mentioned Embodiments 2 and 3, the material is not limited to silicon material in the present invention. It is also possible to manufacture a plate of metal material such as stainless steel or a plate of organic polymeric material in the same manner as described above. In that case, a similar function can be exhibited.

Embodiment 4

Figure 10:
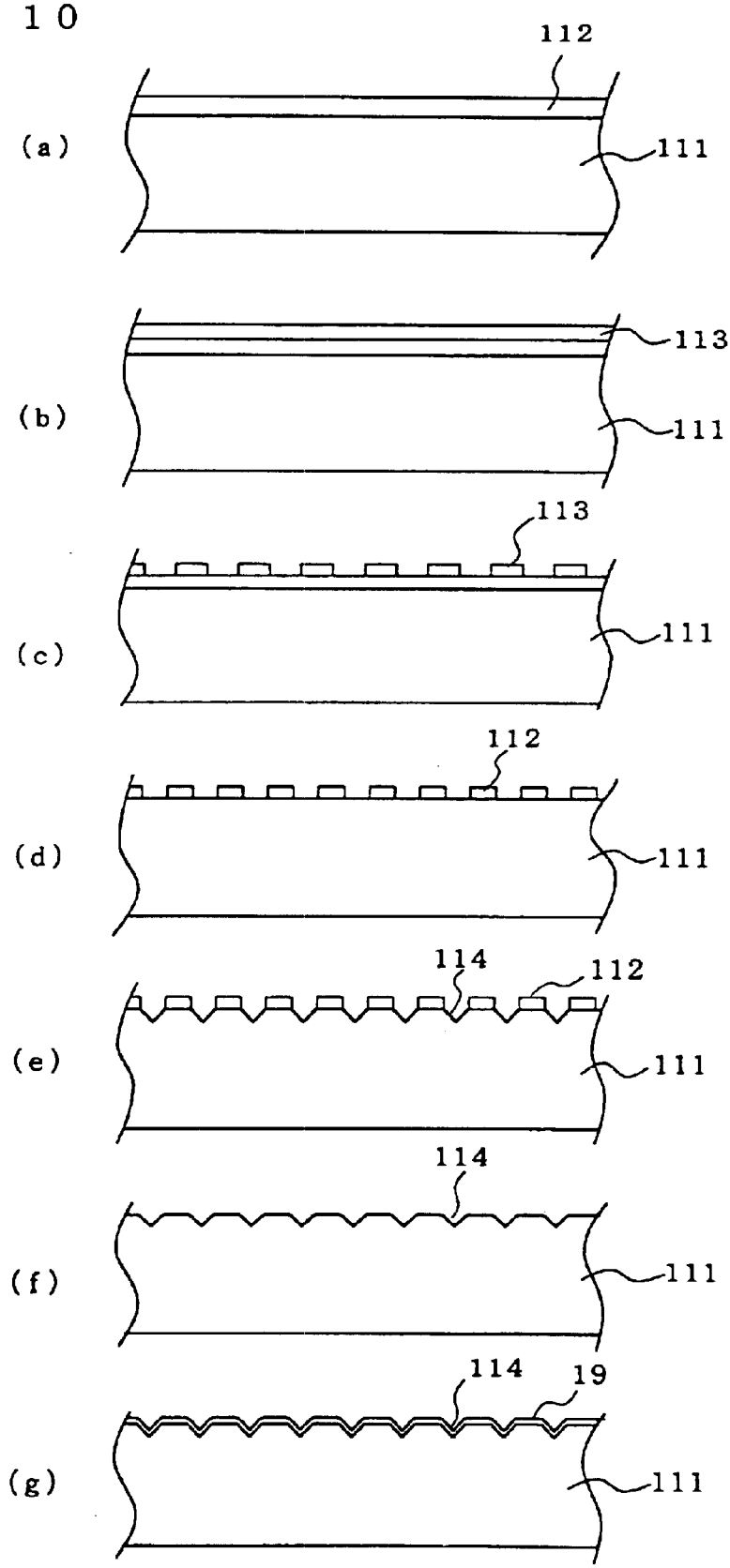
FIGS. 10a–10g are sectional views showing a manufacturing process for forming a water-repellent structure on a surface of a plate in a manufacturing method according to Embodiment 4 of the present invention.

FIG. 10 is a sectional view showing a further example of a manufacturing process for forming a water-repellent structure on a surface of a plate. Here, description will be made about the case where a surface of a silicon substrate is worked by a photolithography method and an anisotropic wet etching method so as to form a water-repellent structure.

① First, a 4-inch single-crystal silicon wafer of the (100) crystal orientation is prepared as base material of a plate 1. A silicon oxide film 112 having a thickness of about 1,000 Angstroms is formed on at least one surface of a single-crystal silicon substrate 111 by use of a thermal oxidation method, as shown in FIG. 10(*a*).

② Next, as shown in FIG. 10(*b*), about 2 ml of photosensitive resin OFPR-800 (viscosity: 30 cps) made by TOKYO OHKA KOGYO CO., LTD. is dropped onto the silicon oxide film 112 of the single-crystal silicon substrate 111, and spin-coated for 30 seconds at the velocity of 5,000 rotations per minute, so as to form a photosensitive resin film 113. By these spin-coat conditions, the photosensitive resin can be applied so that the average film thickness is about 1 $\mu$m with dispersion of 10% within the wafer surface. Incidentally, the coating thickness is changed appropriately in accordance with the size of a groove to be worked. The maximum value of the thickness of the photosensitive material film to be applied is 2 $\mu$m when the size of the width of the groove is 2 $\mu$m.

③ Next, the substrate 111 is dried for 30 minutes in an oven at a temperature of 90° C., and cooled down to the room temperature. As shown in FIG. 10(*c*), protrusion-portion-expected areas 113 which are 0.2 $\mu$m to 200 $\mu$m square are left on the substrate 111 by photolitho-patterning. Then, the photosensitive resin is solidified by the oven at a temperature of 120° C., so that the etching-proof property is improved.

④ As shown in FIG. 10(*d*), the silicon oxide film in groove-expected areas is etched with fluoric acid, and the photosensitive resin is removed by release agent.

⑤ Next, sectionally V-shaped etching pyramids 114 are formed in the silicon substrate 111 by an anisotropic etching method with a potassium hydrate solution using the silicon oxide film 112 as a mask, as shown in FIG. 10(*e*). Then, the silicon oxide film 112 is removed (FIG. 10(*f*)). These etching pyramids 114 formed thus correspond to the recess portions 17 in FIG. 1. Production of the recess portions 17 results in formation of the recess portions 18 inevitably, so that the protrusion portions 18 are laid out regularly on the surface of the single crystal silicon substrate 111, as shown in FIG. 6.

⑥ Next, water-repellent material such as fluoroalkylsilaane or polyfluoroethylene is deposited on the plate by a vacuum deposition method, so as to form a water-repellent film 19 (FIG. 10(*g*)).

Embodiment 5

Figure 11:
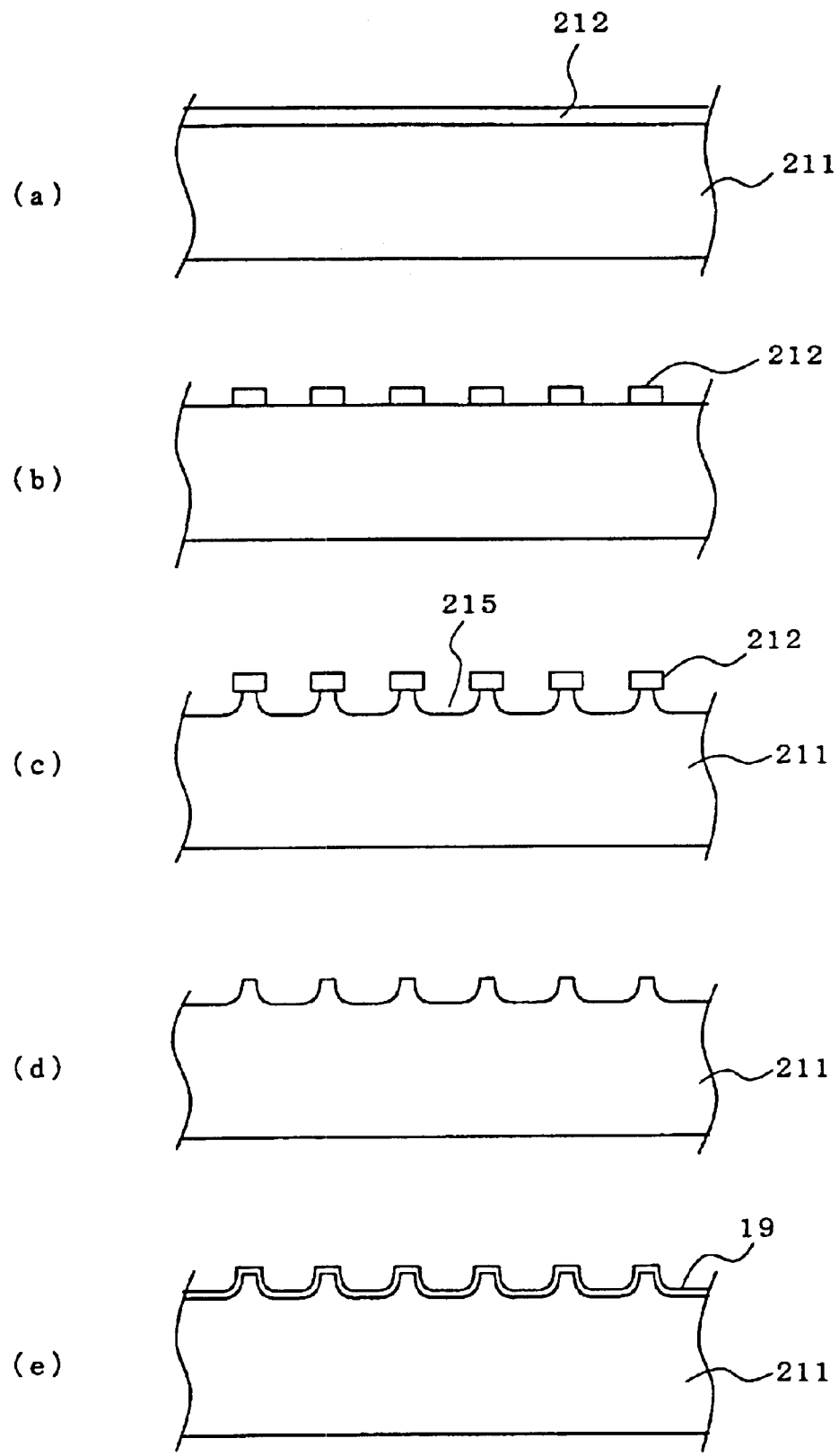
FIGS. 11a–11e are sectional views showing a manufacturing process for forming a water-repellent structure on a surface of a plate in a manufacturing method according to Embodiment 5 of the present invention.

FIG. 11 is a sectional view showing a further example of a manufacturing process for forming a water-repellent structure on a surface of a plate. Here, description will be made about the case where a surface of a silicon substrate is worked by a photolithography method and an isotropic wet etching method so as to form a water-repellent structure.

① First, a glass substrate 211, for example, 200 $\mu$m thick, is prepared as base material of a plate 1.

② A silicon nitride film 212 having a thickness of 0.3 $\mu$m is formed as etching-proof film on this glass substrate 211 by a sputtering apparatus, as shown in FIG. 11 (*a*).

③ Next, photolitho-etching is given to the silicon nitride film 212 so that the silicon nitride film is etched in portions corresponding to the recess portions 17 in the water-repellent structure, as shown in FIG. 11(*b*).

④ Next, etching recess portions 215 are formed in the glass substrate 211 by an isotropic etching method with a hydrofluoric acid solution using the silicon nitride film 212 as a mask, as shown in FIG. 11(*c*).

⑤ Next, the silicon nitride film 212 is removed with hot phosphoric acid so that the irregularities are completed, as shown in FIG. 11(*d*).

⑥ Next, a fluoroalkylsilane film as a water-repellent film 19 is deposited on the plate by a vacuum deposition method (FIG. 11(*e*)).

Embodiment 6

Figure 12:
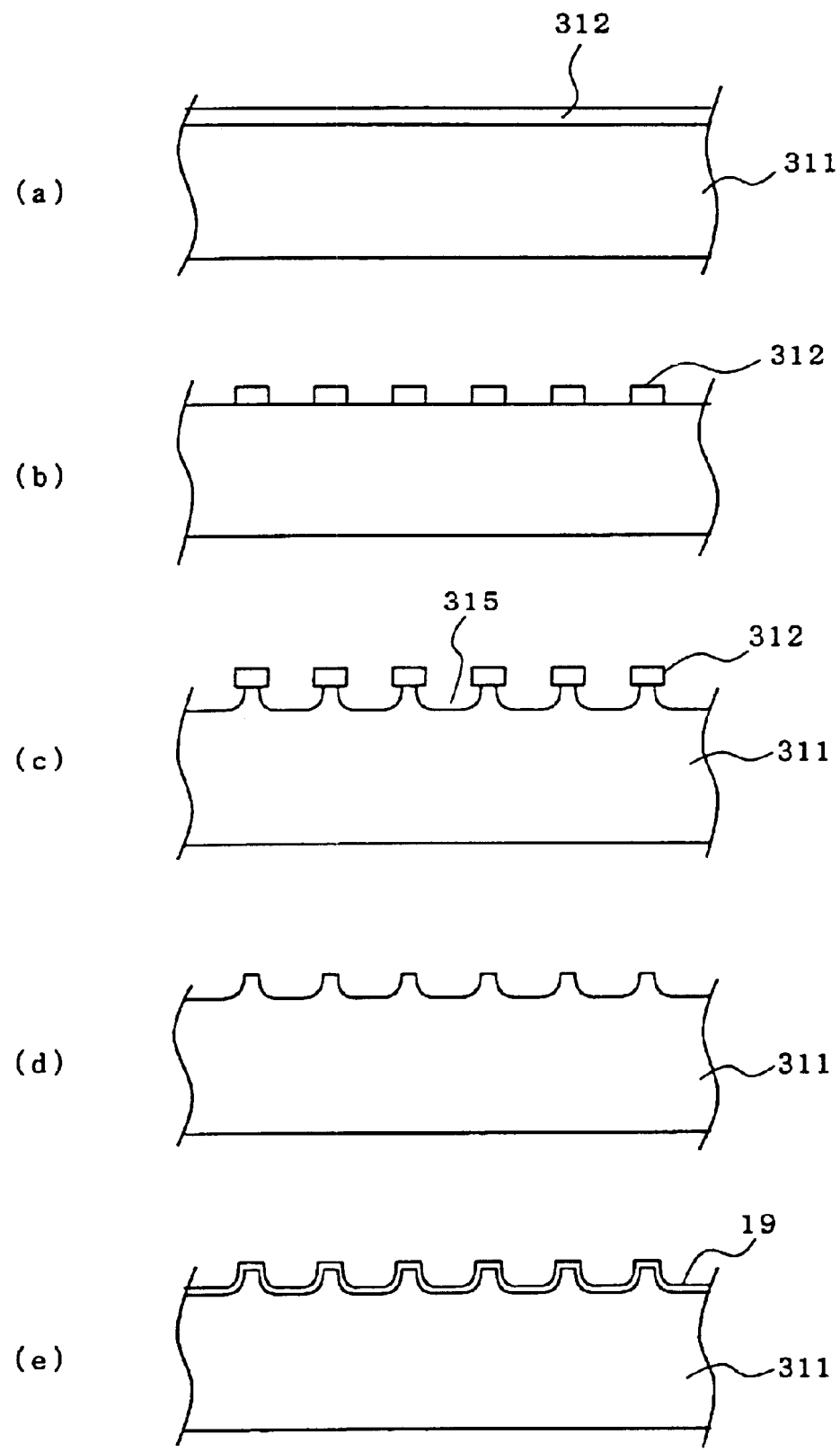
FIGS. 12a–12e are sectional views showing a manufacturing process for forming a water-repellent structure on a surface of a plate in a manufacturing method according to Embodiment 6 of the present invention.

FIG. 12 is a sectional view showing a further example of a manufacturing process for forming a water-repellent structure on a surface of a plate. Here, description will be made about the case where the surface of a silicon substrate is worked by a photolithography method and an isotropic dry etching method so as to form a water-repellent structure.

① First, a glass substrate 311, for example, 200 $\mu$m thick, is prepared as base material of a plate 1.

② A photosensitive rein film 312 about 5 $\mu$m thick is formed as etching-proof film on this glass substrate 311 by a spin coat apparatus, as shown in FIG. 12(*a*).

③ Next, the photosensitive rein film 312 is etched in portions corresponding to the recess portions 17 in the water-repellent structure by photolitho-etching, as shown in FIG. 12(*b*).

④ Next, etching recess portions 315 are worked in the glass substrate 311 by an isotropic plasma etching method with CF4 gas using the photosensitive rein film 312 as a mask, as shown in FIG. 11(*c*).

⑤ Next, the photosensitive rein film 312 is removed with hot sulfuric acid so that the irregularities are completed, as shown in FIG. 11(*d*).

⑥ Next, a fluoroalkylsilane film as a water-repellent film 19 is deposited on the glass substrate 311 by a vacuum deposition method (FIG. 11(*e*)).

Even in the water-repellent structures produced in the above-mentioned Embodiments 4 to 6, it was confirmed that a water-repellent function, durability and scratch resistance similar to those in the above-mentioned Embodiment 2 could be obtained because of the even height of the protrusion portions.

In the above-mentioned Embodiments 2 to 6, a water-repellent structure is produced by a photolithography method and an etching method so that a surface of the base material can be replaced by the tops of protrusion portions. Accordingly, the protrusion portions inevitably become even in height with precision.

Embodiment 7

Figure 13:
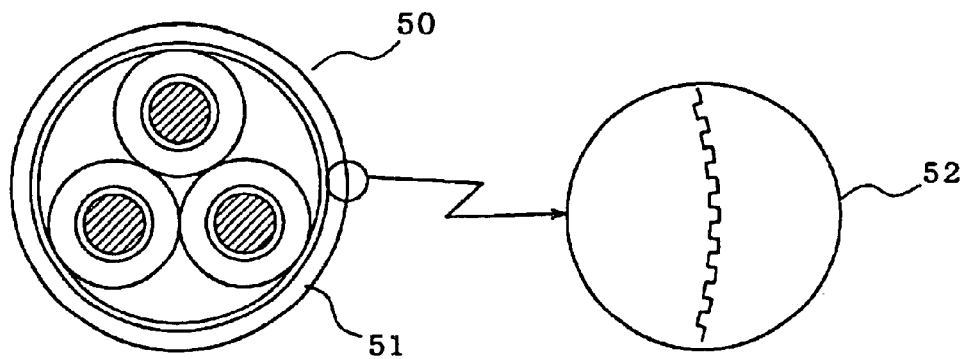
FIG. 13 is a sectional view of a power line according to Embodiment 7 of the present invention.

FIG. 13 is a sectional view of a power line according to Embodiment 4 of the present invention. In this power line 50, a water-repellent structure 52 is formed on the external surface of a sheath (vinyl) 51 constituting a jacket of the power line 50. To form this water-repellent structure 52, for example, the outer circumference of the sheath 51 is embossed after wire drawing, or grooves are formed at the time of wire drawing.

Figure 14:
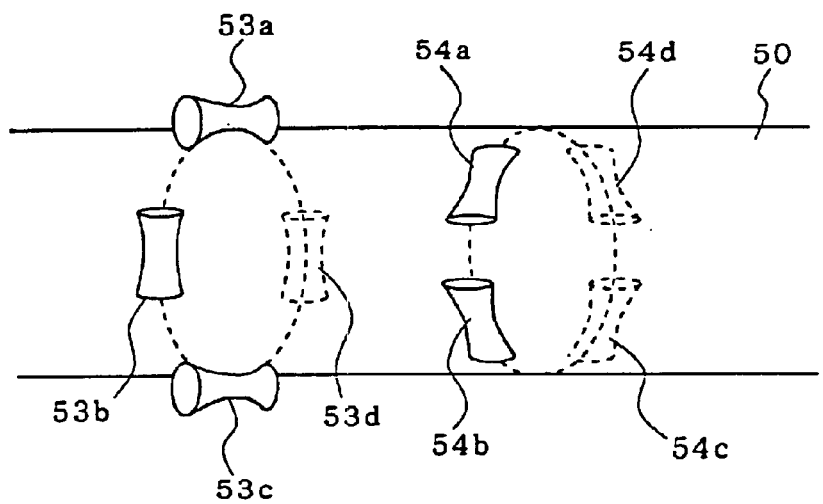
FIGS. 14 and 15 are a perspective view and a front view, respectively, of a mechanism for embossing the circumference of the power line after wire drawing to thereby form a water-repellent structure on the power line.
Figure 15:
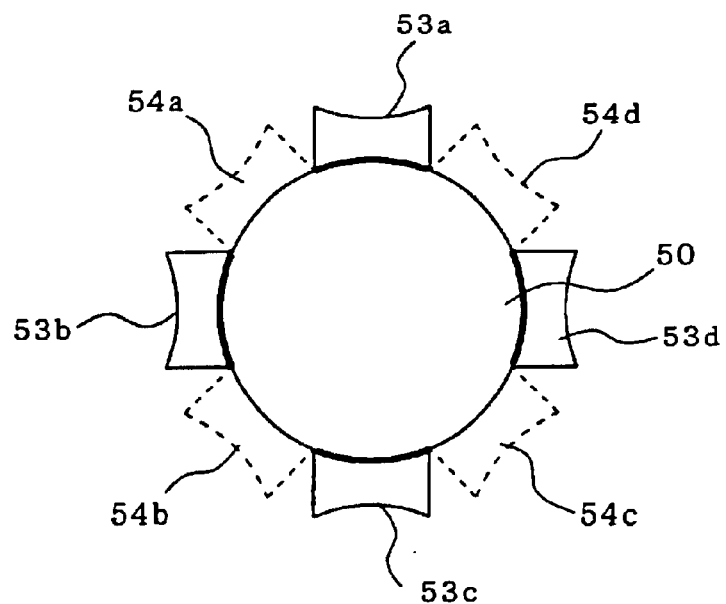

FIGS. 14 and 15 are perspective and front views, respectively, of a mechanism for embossing the outer circumference of the sheath 51 after wire drawing so as to form the water-repellent structure 52 on the outer surface of the sheath 51. In this mechanism, a set of four rollers 53a to 53d and another set of four rollers 54a to 54d are disposed around the power line 50 so as to be shifted from each other in the longitudinal and circumferential directions of the power line 50. An irregular portion (not shown) for forming the water-repellent structure 52 on the external surface of the sheath (vinyl) 51 is provided on the external surface of each of the rollers 53a to 53d and 54a to 54d. In the state where the power line 50 is moved in the direction of the illustrated arrow, the rollers 53a to 53d and 54a to 54d rotate while embossing the power line 50 so that the water-repellent structure 52 is formed all over the external surface of the sheath 51 of the power line 50. Incidentally, the power line 50 may be moved by the rollers 53a to 53d and 54a to 54d. Alternatively, the power line 50 may be moved while being rotated.

Figure 16:
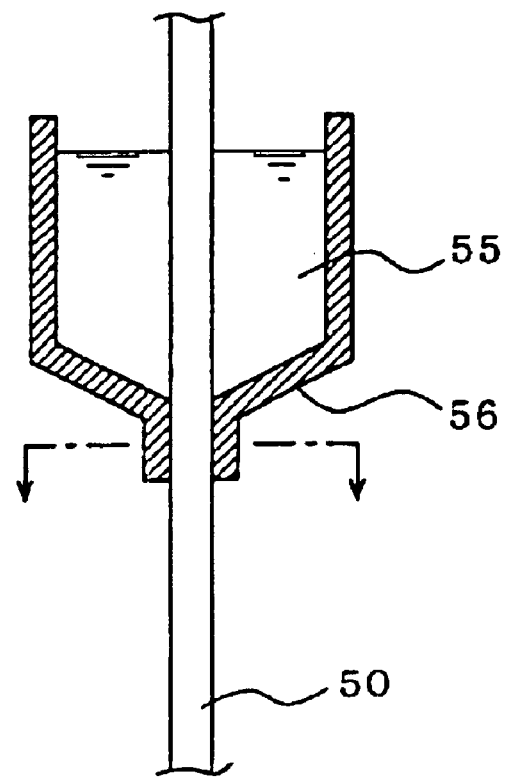
FIGS. 16 and 17 are a sectional view of a mechanism for forming a water-repellent structure on the power line at the time of wire drawing, and a sectional view of a die thereof, respectively.
Figure 17:
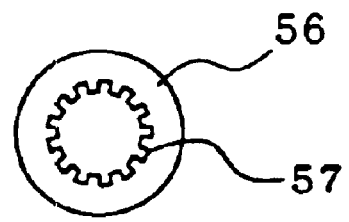

FIG. 16 is an explanatory view showing a mechanism for forming grooves in the sheath 51 at the time of wire drawing. FIG. 17 is a sectional view of a die of the mechanism. In wire drawing, vinyl 55 is coated by use of a die 56 so that the sheath 51 is formed. At this time, irregularities 57 are formed in the inner wall of the die 56 in advance as shown in FIG. 14 so that the water-repellent structure 52 is formed on the external surface of the sheath 51. The power line 50 may be drawn while being rotated.

Embodiment 8

Figure 18:
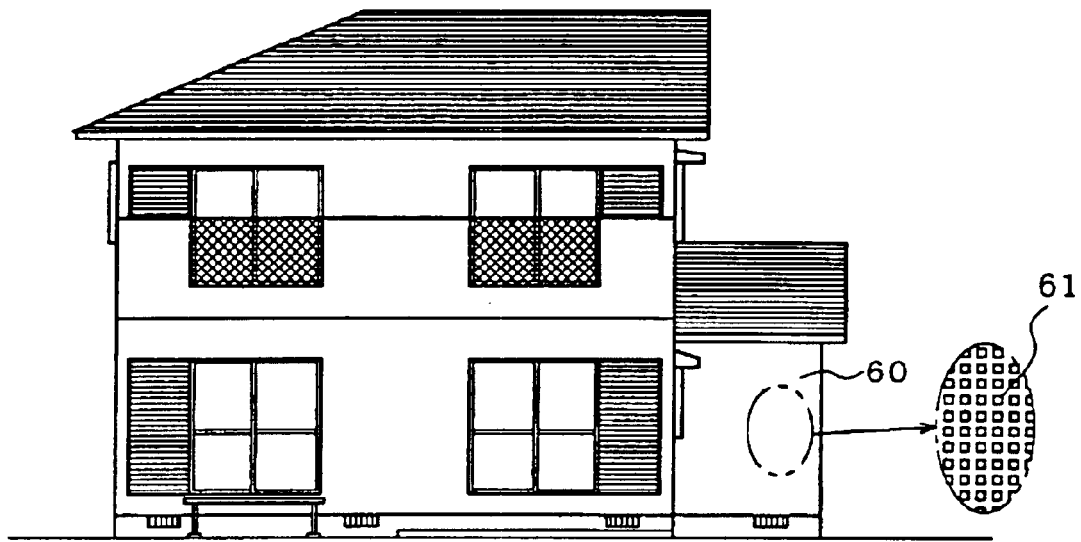
FIG. 18 is an explanatory view of a building material according to Embodiment 8.

FIG. 18 is an explanatory view of a building material according to Embodiment 8 of the present invention. A water-repellent structure 61 is formed on the external surface of this building material 60. To form this water-repellent structure 61, there are, for example, a method of performing a lithography method and an etching method which have been described in Embodiments 2 to 6; a method of embossing the surface of the building material 60; and so on.

Figure 19:
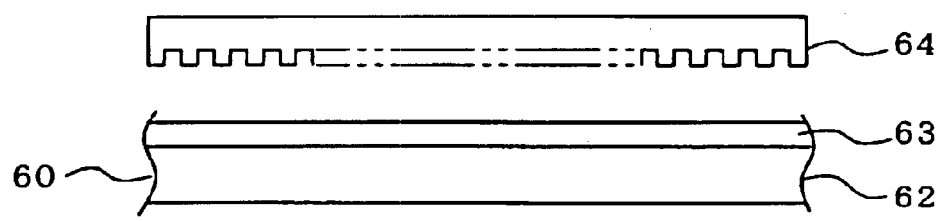
FIG. 19 is an explanatory view when a water-repellent structure is formed by embossing.

FIG. 19 is an explanatory view when the water-repellent structure 61 is formed by embossing. The building material 60 is, for example, constituted by a panel 62 and a thick coated film 63 formed on a surface of the panel 62. A pattern 64 in which irregularities have been formed is pressed to the coated film 63 before the coated film 63 is solidified so that the water-repellent structure 61 is formed. This pattern may be manufactured, for example, by any manufacturing method according to the above-mentioned Embodiments 2 to 6.

Embodiment 9

Figure 20:
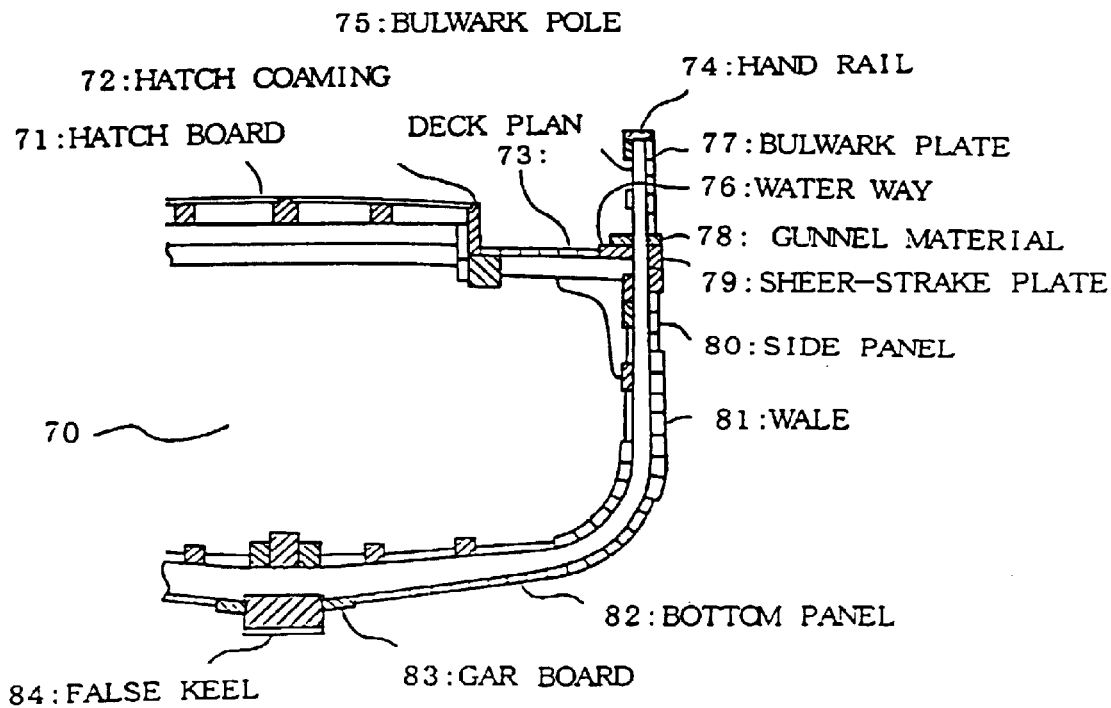
FIG. 20 is a sectional view of a ship according to Embodiment 9 of the present invention.

FIG. 20 is a sectional view of a ship according to Embodiment 9 of the present invention. A water-repellent structure which is similar to that in the above-mentioned embodiments is formed on the external surfaces of portions of this ship 70 which may come in contact with water, such as a hatch board 71; a hatch coaming 72; a deck plank 73; a hand rail 74; a bulwark pole 75; a water way 76; a bulwark plate 77; a gunnel material 78; a sheer-strake plate 79; a side panel 80; a wale 81; a bottom panel 82; a garboard 83; a false keel 84; and so on. This water-repellent structure is formed by pressing of the pattern 64 in FIG. 19 shaped into a roll, or by pasting a film-like body formed according to any one of the above-mentioned Embodiments 2 to 6. For example, PTFE (polytetrafluorethylene) or silicon resin is used as this film-like body.

Embodiment 10

Figure 21:
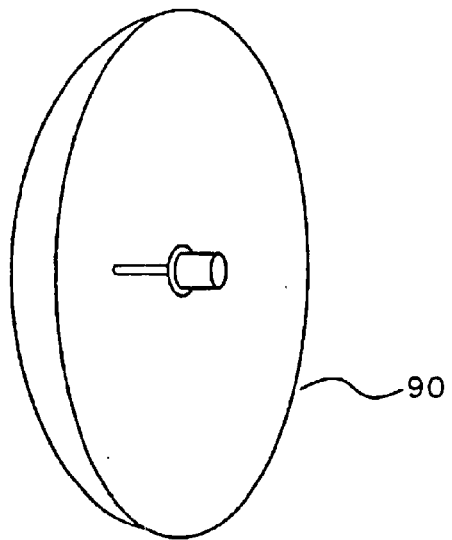
FIG. 21 is a perspective view of an antenna according to Embodiment 10 of the present invention.

FIG. 21 is a perspective view of an antenna (parabola) according to Embodiment 10 of the present invention. A water-repellent structure similar to that in the above-mentioned Embodiments is formed on the surface of this antenna 90. This water-repellent structure is formed by pressing of a pattern having irregularities which are similar to that in FIG. 19 and which correspond to the antenna, or by pasting a film-like body formed according to any one of the above-mentioned Embodiments 2 to 6.

Even in the above-mentioned Embodiments 7 to 10, the water-repellent structure may be further subjected to a water-repellent treatment so as to form a water-repellent film.

In addition to the above mentioned embodiments, any portion which is apt to be easily damaged by adhesion of water or oil will be a target of the structural members according to the present invention. For example, structural members according to the present invention may be used for outside walls of airplanes. In that case, adhesion of ice and snow is prevented, so that the safety and fuel economy of the airplanes are improved.

What is claimed is:

1. A structural member formed of a single crystal silicon substrate, comprising:
    a water-repellent structure formed on an external surface of said structural member, said water repellent structure is constituted by irregularities of protrusion portions and recess portions and said protrusion portions are substantially uniform in height and shaped as prisms,
    wherein said protrusions have a top surface width in a range of 1 to 10 $\mu$m and said recesses have an upper opening width in a range of 1 to 10 $\mu$m, so that any droplet minimally falls in any of said recess portions and each droplet comes into contact with an air layer in each of said recess portions.

2. The structural member according to claim 1, wherein each of said recess portions has a depth of about 5 μm.

3. The structural member according to claim 1, wherein a water-repellant film reactively bonded with said irregularities of said water-repellent structure is formed on said irregularities.

4. The structural member according to claim 1 wherein said prisms further comprise at least one of the group selected from square prisms, triangular prisms, pentagonal prisms and hexagonal prisms.

5. The structural member according to claim 1, wherein each of said recess portions has a depth of about 3 μm.

6. The structural member according to claim 1, wherein each of said recess portions has a depth of about 1 μm.

7. The structural member according to claim 1 wherein said protrusion portions have an evenness of height which is within 0.1 times a width of one of the group selected from the protrusion portions and the recess portions.

8. The structural member according to claim 7, wherein each of said recess portions has a depth of about 5 μm.

9. The structural member according to claim 7, wherein each of said recess portions has a depth of about 3 μm.

10. The structural member according to claim 7, wherein each of said recess portions has a depth of about 1 μm.

11. The structural member according to claim 7, wherein said prisms further comprise at least one of the group selected from square prisms, triangular prisms, pentagonal prisms and hexagonal prisms.

12. The structural member according to claim 1 wherein said protrusion portions have an evenness of height which is within 0.3 times a width of one of the group selected from the protrusion portions and the recess portions.

13. The structural member according to claim 1 wherein said protrusion portions have an evenness of height which is within 0.5 times a width of one of the group selected from the protrusion portions and the recess portions.

14. A structural member formed of a single crystal silicon substrate comprising:

a water-repellent structure formed on an external surface of said structural member, said water repellent structure is constituted by irregularities of protrusion portions and recess portions and said protrusion portions are substantially uniform in height with an evenness of height which is within 0.5 times a width of one of the group selected from the protrusion portions and the recess portions wherein said protrusions have a top surface width in a range of 1 to 10 μm and said recesses have an upper opening width in a range of 1 to 10 μm, so that any droplet minimally falls in any of said recess portions and each droplet comes into contact with an air layer in each of said recess portions.

15. The structural member according to claim 14, wherein said irregularities comprises the protrusions arranged in one of a distribution, in lines, and in a lattice.

\* \* \* \* \*